March 7, 1933. E. H. CORLETT 1,900,757
MEASURING AND COMPUTING INSTRUMENT
Filed June 13, 1929 2 Sheets-Sheet 1
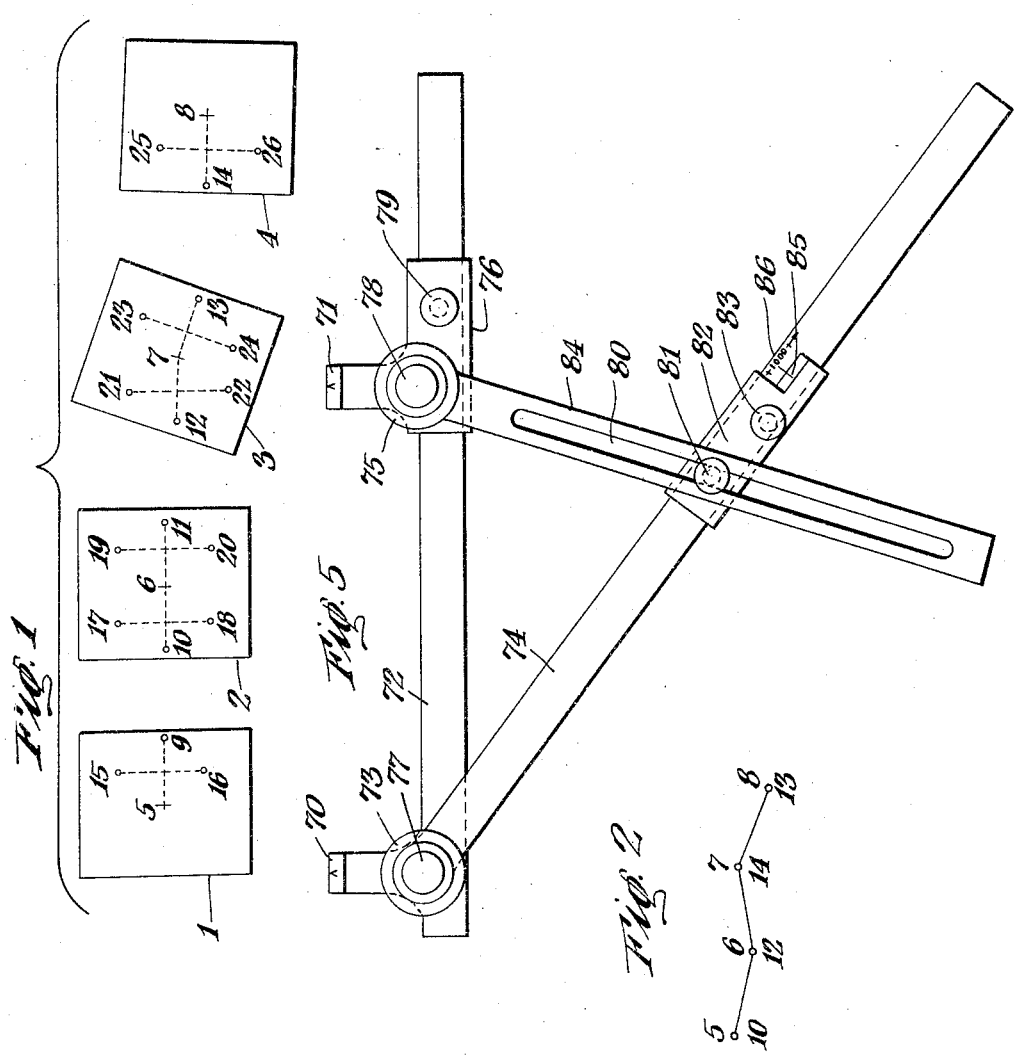
INVENTOR
Edwin Howard Corlett
BY
Hoguet & Neary
ATTORNEYS

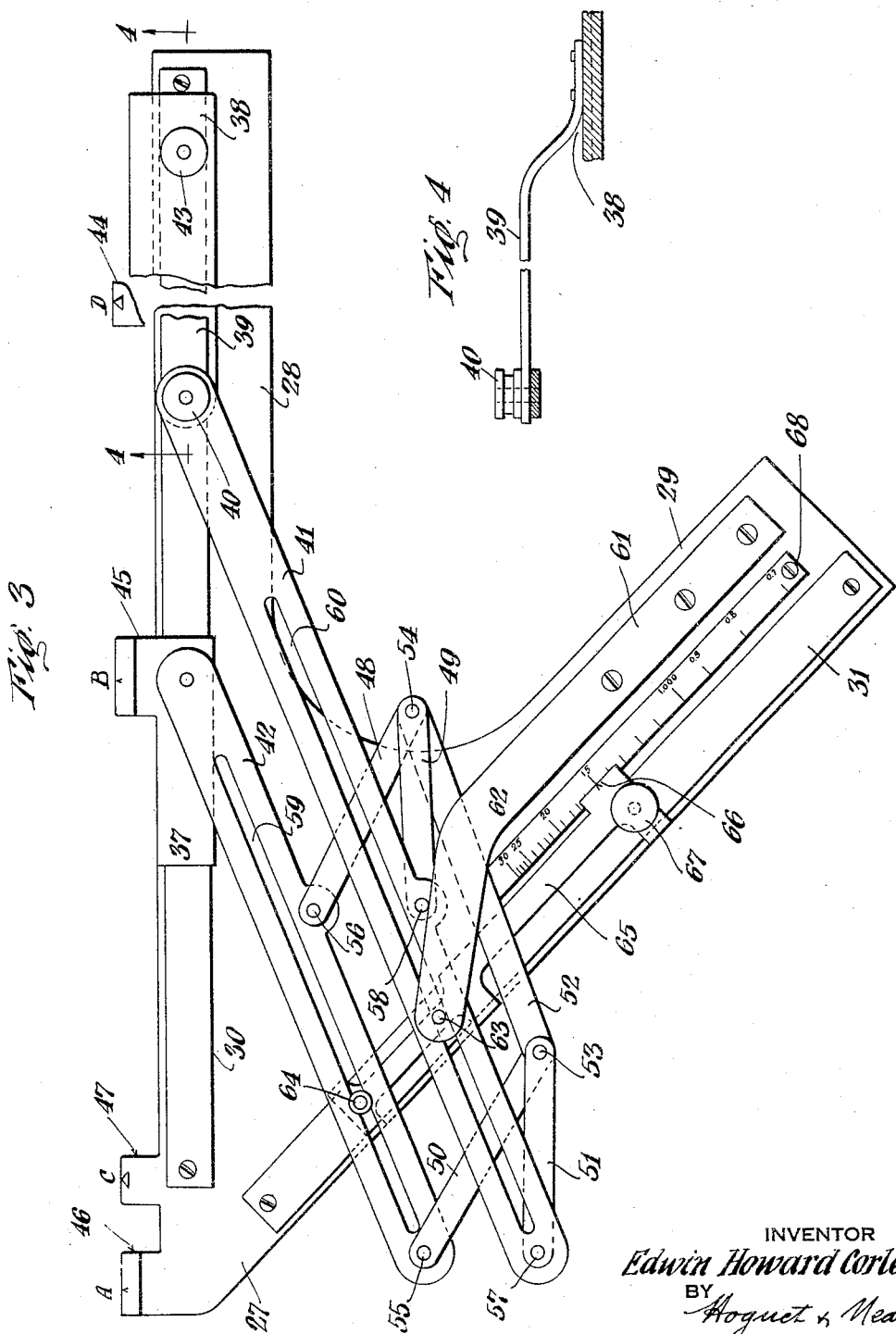

Patented Mar. 7, 1933                                                        1,900,757

UNITED STATES PATENT OFFICE

EDWIN HOWARD CORLETT, OF NEW YORK, N. Y., ASSIGNOR TO FAIRCHILD AERIAL SURVEYS, INC., OF NEW YORK, N. Y., A CORPORATION OF NEW YORK

MEASURING AND COMPUTING INSTRUMENT

Application filed June 13, 1929. Serial No. 370,620.

This invention relates to methods of and means for determining diameters of magnification (hereinafter referred to as "ratios") of a series of aerial photographs used in preparing a mosaic and also for facilitating the laying out of the relative positions of lens of the aerial camera at the exposure instants (hereinafter referred to as "center line traverse") at the scale of the mosaic.

Heretofore, the determination of ratios has been accomplished by scale measurement of certain corresponding distances in the overlap area of sequential aerial photographs or prints, the tabulation of these distances, and the computation therefrom of the ratios of the individual prints. Once the individual print ratios are known, the center line distance on each print is scaled; this multiplied by the print ratio and the true center line distance thereby derived and laid out on paper.

It is an object of this invention to provide a measuring device whereby the enlarging factors of ratio prints may be determined by setting and laying off center line traverse distance by magnification scale settings, and without the necessity of print to print computation heretofore employed.

With the foregoing and other objects in view the invention consists in the novel methods and means hereinafter set forth, certain embodiments being illustrated in the accompanying drawings, in which:

Fig. 1 is a diagrammatical illustration of a series of overlapping prints showing center line traverse distances and print to print distances.

Fig. 2 is a diagrammatical illustration of a center line traverse plotted from the four prints shown in Fig. 1.

Fig. 3 is a top plan view of the preferred form of measuring device.

Fig. 4 is a view in section taken along line 4—4 of Fig. 3.

Fig. 5 is a top plan view of a modification of the measuring device.

Referring more particularly to the drawings in Fig. 1 there are shown four prints 1, 2, 3 and 4. The center of print 1 is shown at 5; of print 2 at 6; of print 3 at 7; and of print 4 at 8. Point 9 of print 1 is the image of point 6 of print 2; point 10 of print 2 is the image of point 5 of print 1; point 11 of print 2 is the image of point 7 of print 3; point 12 of print 3 is the image of point 6 of print 2; point 13 of print 3 is the image of point 8 of print 4; and point 14 of print 4 is the image of point 7 of print 3.

The center line distance on print 1 is 5—9 and it corresponds to the first center line distance 10—6 of print 2. The second center line distance on print 2 is 6—11 and it corresponds to 12—7 on print 3, and so on to the end of the series of sequential prints.

The lines 15—16, 17—18, 19—20, etc., are known as print to print distances and connect the images of ground points approximately on the perpendicular bisectors of 5—9, 10—6, 6—11, etc., respectively. The point imaged at 15 is the same point imaged at 17, 16 at 18, 19 at 21, 20 at 22, etc. The lines 10—6—11 and 12—7—13 are traverse angles formed by legs 10—6 and 6—11, and 12—7 and 7—13 respectively.

The ratio of print 1 being known or assumed, the distance 17—18 varies from 15—16, and the ratio of print 2 is different from the ratio of print 1. Thus, suppose it is known that print 1 scales 1″ equals 800′ and that a mosaic at 1″ equals 400′ is desired. Then the ratio of print 1 is 2.000. Suppose 15—16 is 4.00″ and 17—18 is 3.80″, then the ratio of print 2 in order to bring it to the scale of the mosaic must be $$\frac{4.00 \times 2.000}{3.80} = 2.105 \text{ approximately.}$$

The same process may be repeated between print 2 and 3, and 3 and 4, etc., to the end of the strip. Now suppose 5—9 is 3.00″ on print 1, 10—6 will therefore be $$\frac{3.00 \times 3.80}{4.00} = 2.95″;$$

laid out at 1″ equals 400′, it will be 2.105 × 2.95 = 6.00″. Let 6—11 scale 3.50″ on print 2, at 1″ equals 400′, it will actually appear 2.105 × 3.50″ = 7.37″, approximately.

This process may be carried on to the end of the strip, resulting in a plotted traverse, at the scale of 1″ equals 400′ as indicated in Fig. 2. The transference of angles at 6 and 7 may be accomplished by a protractor or similar instrument or on an illuminated table.

As shown in Fig. 3, the print ratio scale comprises a flat piece 27 having a base bar 28 and a ratio bar 29 disposed in angular relation. On the base bar 28 is mounted a straight base slide 30 while the ratio bar 29 is provided with a ratio slide 31. The base bar 28 is provided with four gauge members or elements A, B, C and D; A and C being integral with the bar; B and D having runners 37 and 38 respectively, slidably mounted on the slide 30. As shown in Fig. 4 the runner 38 has firmly mounted thereon a pivot cantilever 39 with a pivot 40 at its end. A unit parallel arm 41 is pivoted about the pivot 40 and the cantilever 39 is raised high enough to allow sufficient clearance for the runner 37 and an arm 42 parallel with arm 41 to slide beneath the cantilever 39. Runner 38 is provided with a set screw or the like 43 which may be used to lock the runner 38 and the gauge D and its index 44 on the slide 30. The runner 37 carries the gauge B and its index 45 as shown. The fixed gauges A and C are provided with indices 46 and 47 respectively.

The unit parallel arm 41 and a ratio parallel arm 42 are maintained in parallel relation by a common linkage device comprising links 48, 49, 50 and 51 of the same lengths between pivot points, as shown, and a link 52 is provided it being the same length between pivot points 53 and 54 as the length between pivot points 55 and 56 and between pivot points 57 and 58. Pivots 56 and 58 are offset from the center lines of 42 and 41 respectively, only so as not to interfere with sliding actions.

Firmly mounted on the ratio bar 29 is a ratio cantilever 61 the free end 62 of which supports a unit pin 63 high enough to allow the arm 41 to be suspended by a slot 60 and still leave clearance for arm 42 and a ratio pin 64, which is mounted on a ratio runner 65, to pass thereunder. If the piece 27 is laid horizontal, then for most accurate results, arms 41 and 42 should also always be horizontal. For mechanical reasons, links 48, 49, 50, 51 and 52 should preferably also be horizontal.

The ratio runner 65 is provided with a ratio index 66, and with a set screw 67 which may be used to lock the runner 65 fast to the slide 31. The ratio bar 29 is provided with a ratio scale 68 which is so graduated that when pin 64 is directly under pin 63, then the distance between gauges A and B equals that between gauges C and D and the scale reads 1.000. When C D=2×A B, index 66 reads 2.00, and so on for any convenient range of ratios.

Referring to Fig. 1 and assuming the ratio of print 1 to be 2.000, the index 66 is set at 2.000 on the scale 68 and the index is locked in this position by means of the set screw 67. Then the gauges A and B are set on points 15 and 16 respectively of print 1 of Fig. 1 and the set screw 43 turned to lock runner 38 in position. Then the distance C—D is twice that of A—B and equals the mosaic distance represented by the print distance 15—16. Set screw 67 is unlocked and distance A—B is made to equal 17—18 of print 2. In so doing if 17—18 does not equal 15—16, runner 37 will slide on the slide 30 and arm 42 will move parallel to arm 41 dragging runner 65 along with it. Set screw 67 is then locked and index 66 is read on the scale 68 and set screw 43 is unlocked. For any position of runners 37 and 38, C—D will be the mosaic distance of A—B on any part of print 2.

Gauges A and B are then set on points 10 and 6 respectively of print 2; and C—D will be the mosaic, or center line traverse, distance of 10—6; and similarly with 6—11. Gauges A and B are then set on points 19 and 20 of print 2 and set screw 43 locked and set screw 67 unlocked. Gauges A and B are then set on points 21 and 22 respectively of print 3 and set screw 67 locked. Index 66 is again read on 68 giving the ratio of print 3 after which set screw 43 is unlocked and the same procedure is followed as described in connection with print 2.

The print ratios are tabulated for production of mosaic or ratio prints and the center line distances plotted as shown in Fig. 2. One way of checking the assumption of the ratio of print 1 is to know the ratio of print 4 and if the ratio of print 4 determined from point 1, through prints 2 and 3, equals this, the first assumption and the observations en route are correct. However, if this is not the case and it is felt that the observations are correct, then the discrepancy is applied or distributed through all the print ratios as observed according to judgment.

Another method of checking is by an overall distance from one end of the traverse to the other. If the center line traverse does not check this distance, but equals for instance 95% thereof, then each leg is increased by 5% approximately and the ratios are also increased by 5% before being sent in for ratio print production.

In the modification disclosed in Fig. 5 there is shown a more simple device for determining print ratios. This form comprises a base bar 72 and a ratio arm 74 pivotally connected at 77 with a set screw 73 to lock the bar 72 and arm 74 in any desired angular relation. The bar 72 is provided with a stationary gauge 70 and a movable gauge 71, the latter being carried by a runner 76 slidably mounted on the bar 72 and lockable in any desired position by means of the set screw 79. The runner 76 also carries a slide arm 84 pivotally connected thereto at 78 and provided with a set screw 75 to lock the same in desired adjustment.

The arm 74 is scaled at 86 and has slidably mounted thereon a runner 82 with an indicator 85 and a set screw 83 to lock the same in the desired adjustment. The runner 82 also carries a pin 81 which rides in an elongated slot in arm 84.

In operation the clamps 73, 75, 78 and 83 are first unlocked to allow relative movement of the arm 74 and the runners 76 and 82. The ratio arm is then set and locked in any desired position by means of the clamp 73. The runner 82 is set so that the indicator 85, following the example of the preferred form, reads 2.000 on the scale 86 and the runner locked by the clamp 83. The runner 76 is then moved and the gauges 70 and 71 placed on print 1 so that the distance of the gauges equals the print to print distance of print 1, that is, 15—16, after which the runner 76 is locked in position by the clamp 79. Clamp 75 is tightened to prevent pivotal movement of the arm 84 and the clamps 79 and 83 released, allowing movement of the runners 76 and 82.

Gauges 70 and 71 are then set to coincide with the first print to print distance of print 2, that is, 17—18, and the print ratio read on the ratio scale 86. The clamp 83 is then tightened and the clamp 75 loosened and the gauges 70 and 71 set on the second print to print distance on print 2, that is 19—20. The clamps 75 and 79 are then tightened and subsequently clamps 79 and 83 are loosened. Gauges 70 and 71 are then set to the same print to print distance on print 3, that is, 21—22, and the ratio of print 3 to print 1 is read on the scale 86. This method is carried on to the end of the strip as will be understood.

What I claim is:

1. In a device of the class described, a pair of connected and angularly related bars, an adjustable element slidably mounted on one of said bars for setting off a distance on said bar, a second element slidably mounted on said bar for setting off a different distance thereon, the other of said bars being provided with a scale indicator and an element slidably mounted on said bar, each of said elements being fixable in any position to which it may be adjusted, linkages connecting said elements and attached to said non-calibrated bar whereby a movement of either one of the slidable elements on said non-calibrated bar while the other element is fixed, will result in a movement of the element carried by said calibrated bar which will result in the giving of a reading on said scale of the factor by which one of said distances must be multiplied to equal the other of said distances.

2. In a device of the class described, a pair of angularly related and connected bars one of which is provided with a scale, an adjustable element slidably mounted on the bar not provided with a scale for setting off a distance on said bar, a second element slidably mounted on said bar for setting off a different distance thereon, an element slidably mounted on the other bar, each of said elements being fixable in any position to which it may be adjusted, linkages connecting said elements and attached to said bars whereby a movement of any one of said elements alone, while the other two elements are not in fixed position, will result in a movement of both of the other two said elements in such spaced relation to one another that the reading of said element carried by said calibrated bar will always indicate the factor by which one distance set off by one of said first named elements on said non-calibrated bar must be multiplied to equal the other distance set off by the other of said elements.

3. In a device of the class described, mechanical means including a pair of connected divergent bars, one of which is calibrated, a pair of sliding elements mounted on the non-calibrated bar for setting off two different distances in substantially the same straight line, a sliding element mounted on said calibrated bar and means pivotally connecting said three slidable elements for moving said third slidable element to indicate on said calibrated bar the factor by which one of said distances must be multiplied to equal the other.

4. In a device of the class described, a pair of divergent bars upon one of which is mounted a pair of stationary gauge members and a pair of movable gauge members for setting off different distances, the other of said bars being provided with a scale and a slidable ratio runner, pivotal links connecting said movable gauge members to each other and to said ratio runner whereby said ratio runner is adapted to coact with said scale to give a reading denoting the factor by which the known distance between one of said stationary gauge members and a movable gauge member in any adjusted position must be multiplied to equal the unknown distance between the other stationary and movable gauge.

5. In a device of the class described, a pair of connected divergent bars, one of which is calibrated, the non-calibrated bar having mounted thereon a pair of spaced stationary gauge members and a pair of movable gauge members for setting off different distances, a single sliding member mounted on said calibrated bar and adapted to indicate numerally the factor by which the distance on said non-calibrated bar between one stationary gauge member and a movable gauge member must be multiplied to equal the distance between the other stationary and movable gauge member, pivotal levers connecting said three movable elements together and means for locking any one or all of said elements in any adjusted position, the adjustment of one movable element being possible when one of the others is in unlocked position to cause a consequent unequal movement thereof.

In testimony whereof, I have signed my name to this specification this 29th day of May, 1929.

EDWIN HOWARD CORLETT.